Nov. 10, 1964  V. R. BRIGGS  3,156,817
ELECTRICAL SIGNAL ANALYZING SYSTEM
Filed May 13, 1960  2 Sheets-Sheet 1
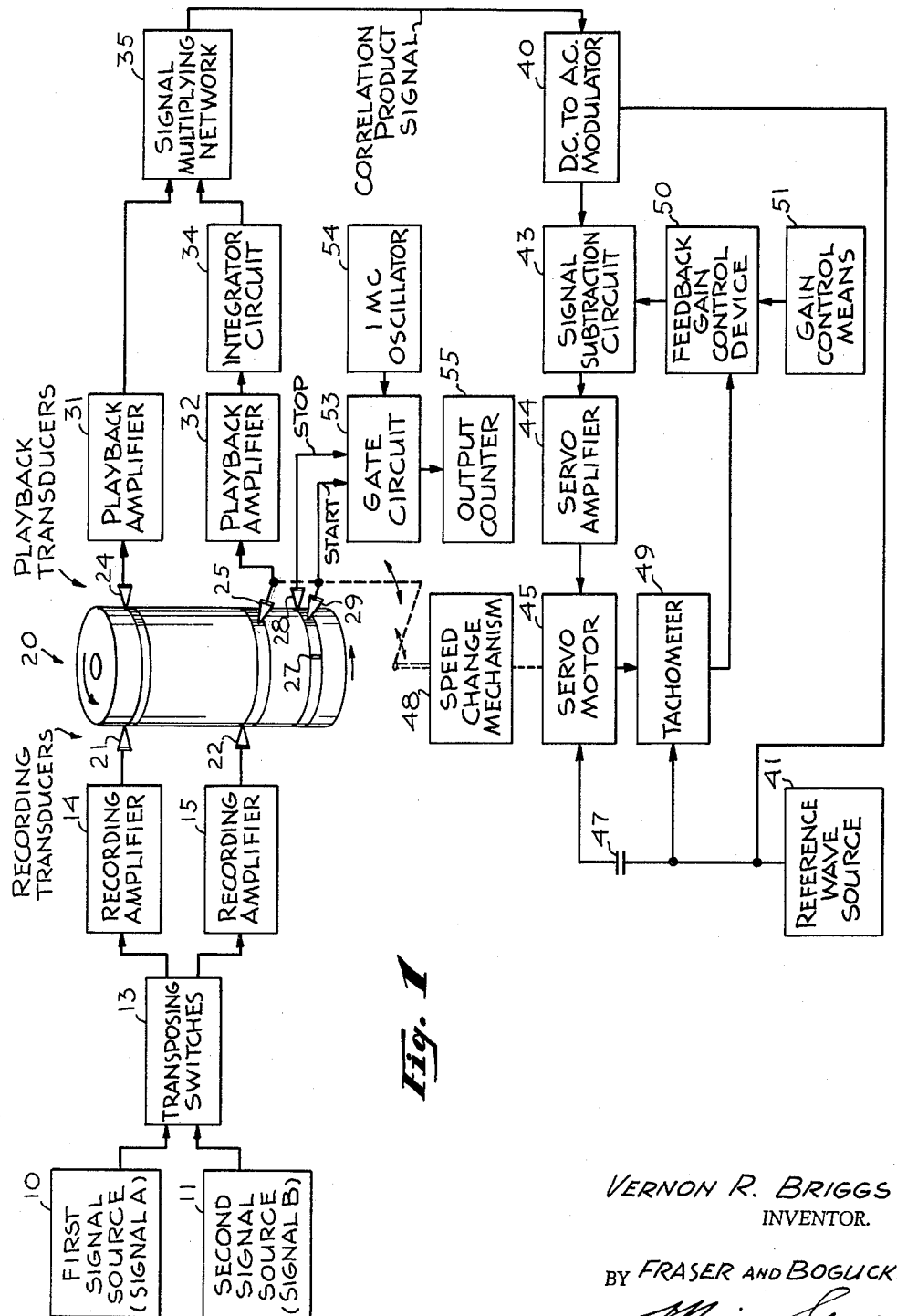
VERNON R. BRIGGS
INVENTOR.
BY FRASER AND BOGUCKI
ATTORNEYS Nov. 10, 1964 V. R. BRIGGS 3,156,817
ELECTRICAL SIGNAL ANALYZING SYSTEM
Filed May 13, 1960 2 Sheets-Sheet 2
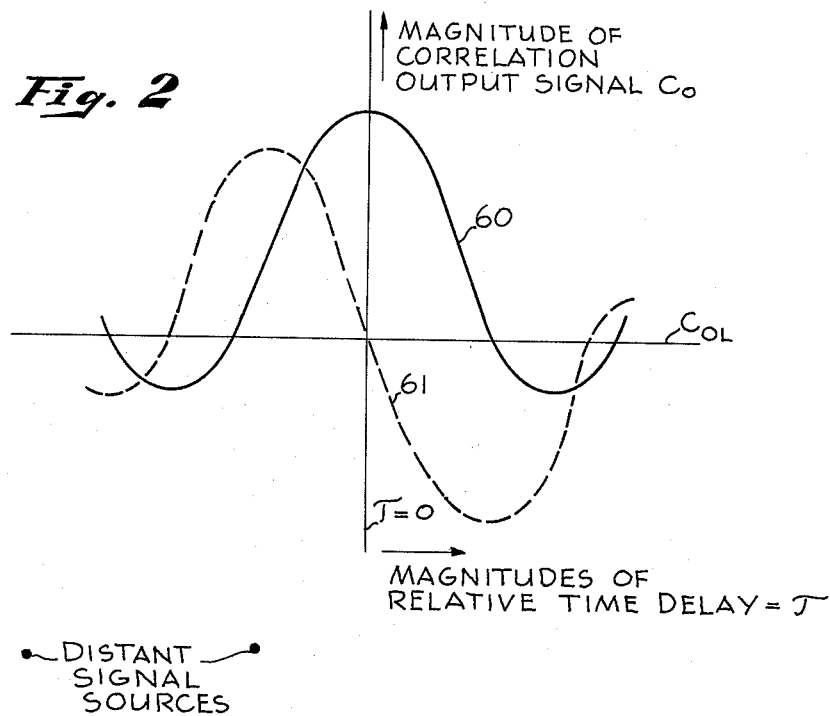
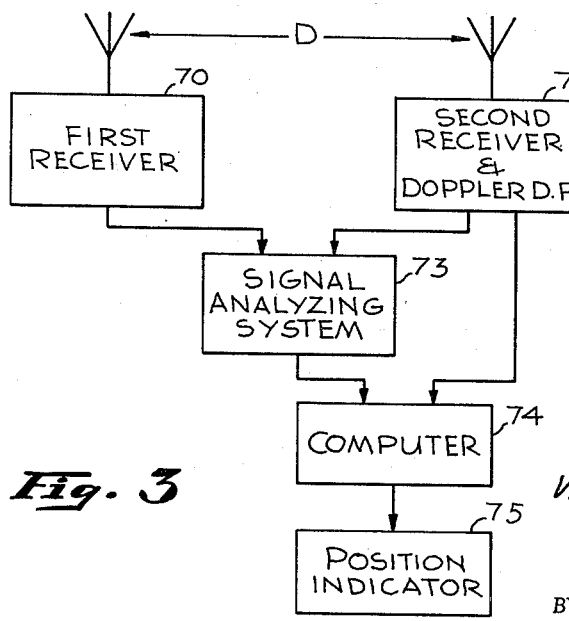
VERNON R. BRIGGS
INVENTOR.
BY FRASER AND BOGUCKI
ATTORNEYS ень
United States Patent Office 3,156,817
Patented Nov. 10, 1964

3,156,817
ELECTRICAL SIGNAL ANALYZING SYSTEM
Vernon R. Briggs, Woodland Hills, Calif., assignor to Thompson Ramo Wooldridge Inc., Canoga Park, Calif., a corporation of Ohio
Filed May 13, 1960, Ser. No. 29,069
4 Claims. (Cl. 235—181)

The present invention relates to improvements in systems which analyze signals and, more particularly, to improved systems for establishing the presence of mutually coherent signal components in two time-varying electrical signals, and for measuring the magnitude of relative timing displacement between such mutually coherent signal components.

Two signals may be regarded as containing mutually coherent signal components when each contains a complex multifrequency component which conforms to substantially the same amplitude-versus-time function as the other. The signals may possibly differ in peak amplitude, power distribution and timing, and the mutually coherent signal components may be displaced in time by some unknown magnitude of relative timing displacement. That is, the timing of the mutually coherent component of one signal may be such that it commences in advance of or, alternatively, after the commencement of its mutually coherent signal component in the other time-varying electrical signal.

Electrical signal correlation techniques have been found useful in determining the value of this timing displacement magnitude. In practicing such techniques, it is conventional to apply both of the time-varying electrical signals to an electrical signal multiplying network which provides a product signal. This product signal is then time averaged or "smoothed" as by being applied to a low pass filter or an integrating network exhibiting a substantial time constant. The thus time-averaged product signal is sometimes termed a "correlation output signal" since the magnitude thereof is directly related to the degree to which the mutually coherent components of the two signals are in time coincidence.

The correlation process is particularly useful in many modern applications, because of the fact that the mutually coherent signal components may be distinguished despite the concurrent presence of high ambient noise levels or other interfering signals. Signal correlation techniques are, therefore, employed in many instances where extremely high sensitivity is desired, extremely weak signals are involved, or high accuracy is required.

The value of an unknown magnitude of timing displacement between the mutually coherent signal components of two time-varying signals is often conveniently determined by controllably introducing known magnitudes of relative time delay between the two signals prior to their multiplication in the multiplying network. As the relative time delay is changed, and the relative timing displacement between the mutually coherent signal components reaching the multiplying network is likewise changed, the magnitude of the correlation output signal varies in a known characteristic fashion dependent upon the time relationship. A maximum correlation output signal is derived from the multiplying network when the mutually coherent signal components reach the multiplying network in time coincidence, or in what may be termed complete correlation. If the correlation output signal is plotted against the values of the magnitude of the relative timing displacement, the value of the correlation output signal may be seen to appear to oscillate about a limiting asymptotic value of the correlation output signal magnitude, so as to cross this limiting asymptotic value of magnitude repeatedly and thereby define a plurality of lower ordered secondary maxima. The problem then of finding the complete correlation relationship is, therefore, one which includes the distinguishing of the true complete correlation timing relationship from those timing relationships producing secondary maxima in the magnitude of the correlation output signal.

In systems which change the magnitude of the relative time delay introduced between the two signals applied to a multiplying network, it is desirable to be able to automatically maintain the relative time delay such that the mutually coherent signal components of the two signals are kept in time concidence. Systems which operate to seek and follow changes in this time coincidence relationship may be termed "tracking correlators." Tracking correlators have particular promise in applications where the relative timing displacement between the mutually coherent signal components of two relatively low power signals must be discerned with high speed and accuracy. One environment in which these requirements are imposed is that of the air traffic control system, in which the presence of individual aircraft in a given air space volume must be detected rapidly and with precision. Spaced ground stations may receive signal transmissions from different aircraft, and through use of tracking correlators, ascertain the position of the transmitting aircraft.

While signal analyzing systems in accordance with the present invention are particularly suited for air traffic control, they are not limited to such uses. Instead, they may be employed wherever it is desired rapidly to recognize the presence of and then distinguish between mutually coherent signal components in two signals, or to measure the relative timing displacement between the mutually coherent signal components, or both.

The present invention provides new and improved tracking correlators through the use of an electromechanical servo system in conjunction with a variable delay device and a signal multiplying network, these elements being so disposed as to form an automatic signal correlation system. More specifically, systems in accordance with the present invention may employ an electro-mechanical control system coupled to receive product signals from the signal multiplying network and to control the magnitude of relative delay introduced between the two signals prior to their application to the signal multiplying network. In accordance with one aspect of the invention, the servo system may be arranged to include a negative feedback coupling for introducing the time averaging which is desired for the generation of the correlation output signal.

In accordance with another aspect of the present invention, a tracking correlator employing a servo including a negative feedback coupling may be arranged to have some time averaging in each of the signal multiplying network and the servo device, with the greater proportion of the time averaging being provided within the servo device. In accordance with other features of the present invention, the time averaging interval provided in the servo device may be made controllable through the use of variable gain means disposed in the negative feedback loop. Imbalances and inaccuracy introduced into the determination of the timing displacement relationship may be compensated for by employing signal transposition in the signal paths followed by the two signals being correlated.

A better understanding of the invention may be had by reference to the following description, taken in conjunction with the accompanying drawings, in which:

FIG. 1 is a block diagram representation of a signal analyzing system in accordance with the present invention;

FIG. 2 is a graph illustrating various relationships of correlation output signals plotted against relative timing displacement for two signals having mutually coherent signal components; and FIG. 3 is a block diagram representation of an air traffic control system utilizing a signal analyzing system in accordance with the present invention.

Systems in accordance with the present invention provide signal analyzing systems which are particularly useful for measuring the magnitude of relative timing displacements between two signals. Such systems have a number of particular advantages when used in the correlation of two signals containing mutually coherent signal components. Thus, the systems may serve as "tracking" correlators, and may measure the relative timing displacement between the mutually coherent signal components of two different signals.

Referring now to FIG. 1, two signals which contain mutually coherent signal components, signals A and B, are provided from first and second signal sources, 10 and 11 respectively, to the remainder of the system. In the present example, the signal analyzing system will be assumed to be employed in an air traffic control application, and to utilize the relative timing displacement between the mutually coherent signal components of signals derived at separate receivers from a common source in order to compute the position of the common source. The common source of the signals which are to be analyzed will, therefore, be assumed to be an aircraft which provides audio modulated radio frequency transmissions to receivers which are spaced apart at known locations and which may constitute the first and second signal sources 10 and 11.

The signals from the first and second sources 10 and 11 are coupled into two signal paths which are made interchangeable by coupled transposing switches 13. Through use of the transposing switches 13, signal A from the first signal source 10 may be directed to a first recording amplifier 14 or a second recording amplifier 15, while signal B from the second signal source 11 is applied to the opposite one of the recording amplifiers 14 or 15. The amplified signals provided from the recording amplifiers 14 and 15 are applied to a variable delay device, the principal element of which is a rotatable magnetic drum 20. Recording transducers 21 and 22, coupled to receive signals from the individual ones of the recording amplifiers 14 and 15, are disposed to provide recorded signal patterns on the magnetizable surface of the drum 20. Separate playback transducers 24 and 25 are operatively associated with the different signal patterns recorded by the recording transducers 21 and 22 respectively. A first, fixed, one of the playback transducers 24 has a fixed spatial relation to a first of the recording transducers 21, but the second of the playback transducers 25 is coupled to a movable mechanism so that it may be moved relative to the associated recording transducer 22 and the first playback transducer 24. To simplify the representation, the various transducers 21, 22, 24 and 25 have been shown only symbolically by arrows. The mechanical mechanism which controls the position of the second or movable playback transducer 25 has been indicated only by coupling lines for simplicity, but may consist of a rotatable arm assembly having an axis of rotation colinear with the axis of rotation of the magnetic drum 20.

In order to sense the position of the movable playback transducer 25, there is provided a reference mark 27 on the surface of the magnetic drum 20. The reference mark 27 may be a recorded pattern or an embedded segment of magnetic material. Magnetic field variations introduced by the presence of the reference mark 27 are sensed separately by a fixed reference transducer 28 and a movable reference transducer 29. The fixed reference transducer 28 is alined axially along the drum 20 with the first playback transducer 24, while the movable reference transducer 29 is mechanically coupled to the movable playback transducer 25 and moves therewith under control of the mechanism described in more detail below.

The playback transducers 24 and 25 are coupled through different playback amplifiers 31 and 32 respectively to the input terminals of a signal multiplying network 35. The signals from the playback amplifier 32 which is coupled to the movable playback transducer 25 are applied to the signal multiplying network 35 through an integrator circuit 34. In the signal channel in which no integrator circuit is used, therefore, the signals derived from the fixed playback transducer 24 represent differentiated multi-frequency components, due to the fact that the playback transducer 24 senses the rate of change of flux of the recorded signal patterns. Differentiated multi-frequency components are also provided from the movable playback transducer 25, but the integration provided with the integrator circuit 34 compensates for the differentiation. The signals multiplied by the signal multiplying network 35 are therefore a differentiated representation of signal A and a direct representation of signal B (unless the transposition is used, in which case the differentiation is in the opposite channel).

The signal multiplying network 35 is preferably of the balanced type, in which a minimum amplitude product signal is provided when signals are not present on both inputs. It is preferred, in the present example of the invention, to employ a signal multiplying network 35 of a type which has a small time constant, so that some time-averaging or "smoothing" of the product of the two input signals results. With audio modulated signals a time averaging of approximately 0.02 second has been satisfactorily employed. The product signal derived from the signal multiplying network 35, therefore, is a correlation product signal without the introduction of sufficient time averaging to be considered as a correlation output signal, even though it is a direct current (hereafter D.C.) signal.

A closed loop servo control system is coupled between the output terminal of the signal multiplying network 35 and the mechanical movement which controls the positioning of the movable playback transducer 25 and the movable reference transducer 29. This closed loop servo control system includes a D.C. to A.C. modulator 40, such as an electromechanical chopper, which derives reference signals from a reference wave source 41. The alternating current (hereafter A.C.) signal which is provided by the modulator 40 is applied to one input terminal of a signal subtraction circuit 43 and there combined with a negative feedback signal, the development of which is described in greater detail below. The output signal from the signal subtraction circuit 43 when applied through a servo amplifier 44 controls the operation of a servo motor 45. The necessary excitation for the windings of the servo motor 45 is provided from the reference wave source 41 through a phase shift capacitor 47. The output shaft or arm of the servo motor 45 controls the positioning of the movable playback transducer 25 and the movable reference transducer 29 through a speed change mechanism 48.

The negative feedback signal which is applied to the remaining terminal of the signal subtraction circuit 43 is derived from a tachometer 49 which operates in response to the rate of movement of the servo motor 45. Dependent upon the rate of movement of the servo motor 45, and under the excitation of the reference wave source 41, the tachometer 49 generates an A.C. feedback signal in phase with the output signal from the modulator 40. This feedback signal is applied to the signal subtraction circuit 43 in a sense to oppose the correlation product signal. The relative amplitude of the negative feedback signal is further controlled by a feedback gain control device 50, which may be a variable gain amplifier or a variable attenuator operable under the control of a gain control means 51.

The extent of the displacement of the movable playback transducer 25 with respect to the fixed playback transducer 24 is constantly measured and indicated by a counter arrangement which uses signals from the movable reference transducer 29 as start signals and signals from the fixed reference transducer 28 as stop signals. Each of these signals is provided to circuitry which is denoted as a gate circuit 53. The gate circuit 53 may include, for example, a bistable device which is set "on" by a start signal and which thereby primes or conditions a coincidence gate until set "off" by a stop signal. The gate circuit 53 is open, to pass pulses therethrough, during the interval defined by the start and stop pulses. When the gate circuit 53 is open, pulses from a 1 megacycle (mc.) oscillator 54 are passed through the gate circuit 53 to actuate an output counter 55.

For a better understanding of the operation of the system of FIG. 1, reference should first be made to the graphical illustration of FIG. 2. When signals containing mutually coherent signal components are applied to a correlation system which contains means for changing the value of the magnitude of relative time delay between the two signals, certain relationships may be observed. As the value of the magnitude of relative time delay which is introduced between the two signals which reach the multiplying network of the correlation system is changed over a range of values, readings are taken of the magnitude of the correlation output signal $C_O$. If the magnitude of relative timing displacement actually existing between the two signals as they reach and are together multiplied in the multiplying network is assigned the symbol tau ($\tau$) and the magnitude of the correlation output signal is assigned the symbol $C_O$ a plot of the values of magnitude $C_O$ versus the values of magnitude $\tau$ will typically take the form of the mathematical function $$\frac{\sin x}{x}$$

This mathematical function is graphically shown by the solid curved line 60 of FIG. 2. Here it can be seen that the resulting function of $C_O$ versus $\tau$, depicted by curved line 60, appears to oscillate in magnitude about a limiting asymptotic value $C_{OL}$ of magnitude $C_O$. Also, it can be seen that the absolute value of the correlation output signal magnitude is a maximum for a value of relative timing displacement of $\tau=0$. The value $\tau=0$ corresponds to the event of time coincidence or complete correlation between mutually coherent signal components of the respective signals as they reach the multiplying network. Thus, that absolute value of relative time delay introduced between the signals which produces this maximum can then be taken to be substantially equal to the absolute value of the unknown magnitude of timing displacement between signal A and signal B which it is sought to determine. The mathematical function $C_O=F(\tau)$ resulting from the correlation of signal A with signal B, and as depicted by the curved line 60 of FIG. 2, may conveniently be thought of as the "correlation function" characterizing the mutually coherent components of the two signals.

In the arrangement of FIG. 1, therefore, the relative time delay between signal A and signal B is changed by changing the position of the movable playback transducer 25 with respect to the fixed playback transducer 24. Concurrently derived time segments of signal A and signal B which are provided by the first and second signal sources 10 and 11 are likewise recorded concurrently in the different channels by the separate recording transducers 21 and 22, so that the relative timing displacement between the mutually coherent signal components is preserved on the drum 20. The variable time delay which is introduced into the recorded signal representations of signal A and signal B is established by the variable differential position of the playback transducers 24 and 25, as above noted.

A correlation product signal is then derived from the signal multiplying network 35, this correlation product signal representing at any instant a short term average of the representations of signal A and signal B. The correlation output signal originates within the servo which completes the closed loop system. A given amplitude of correlation product signal, when converted to A.C. in the D.C. to A.C. modulator 40 and passed through the signal subtraction circuit 43 and the servo amplifier 44, causes the servo motor 45 to move at a proportional rate. The rate of movement of the servo motor 45, however, generates a negative feedback signal in the tachometer 49, and this negative feedback signal is fed back through the feedback gain control device 50 to the signal subtraction circuit 43 in a sense to reduce the rate of movement of the servo motor 45. This negative feedback effectively integrates the correlation product signal, and introduces the full time averaging which is needed to provide a useful correlation output signal. The movement of the variable playback transducer 25 is therefore in accordance with the correlation output signal, and not the correlation product signal. Under the conditions stated, a time-averaging or smoothing time of approximately 1 second has been found to be satisfactory.

Through use of the integrator circuit 34, the correlation output signal and the positioning of the variable playback transducer 25 act to establish complete correlation between the mutually coherent signal components of signals A and B before they reach the signal multiplying network 35. The differentiated representation of signal A which is provided from the fixed playback transducer 24 through the playback amplifier 31 is multiplied by the direct representation of signal B derived from the variable playback transducer 25 through the playback amplifier 32 and the integrator circuit 34. The effect of integrating the product signal derived from this multiplication, as by the electromechanical servo system previously described, provides the equivalent of the derivative of the correlation function. Referring again to FIG. 2, the derivative of the correlation function, represented by the solid curved line 60 having a maximum at $\tau=0$, is a function represented by a dotted curved line 61 having zero value at $\tau=0$. Additionally, the derivative function curved line 61 has maxima and minima at values of the magnitude $\tau$ where the correlation function curved line 60 crosses the axis $C_{OL}$. Thus the dotted line 61 representing the derivative of the correlation function provides, immediately adjacent the zero value of magnitude $\tau$, maxima of opposite polarity. The value of magnitude $C_O$ is, therefore, dependent in both amplitude and polarity upon the nature of deviation of the relative time delay from the value $\tau=0$, for the derivative of the correlation function represented by the dotted curved line 61. This will be recognized as providing conveniently usable error signals for a servo system of the type shown in FIG. 1. The system may operate to locate and track the zero value of the magnitude $\tau$, by keeping the value of the output signal for the correlation function derivative at substantially zero.

The system operates readily and rapidly to introduce a relative time delay between signals A and B sufficient for the mutually coherent signal components to be reproduced at the playback transducers 24 and 25 in time coincidence. The circumferential displacement of the movable playback transducer 25 about the drum 20 relative to the fixed playback transducer 24 provides an accurate measure of the relative timing displacement between the mutually coherent signal components of signals A and B. The same spatial (and time measurement) differential is also provided by the relative positions of the fixed reference transducer 28 and the movable reference transducer 29. This spatial relationship is converted to a direct digital output, through use of the signal generated by the movable reference transducer 29 when the reference mark 27 passes to provide a start signal, and the signal generated when the reference mark 27 correspondingly passes the fixed reference transducer 28 to provide a stop signal. During the interval between the start and stop signals, the pulses from the 1 MC oscillator 54 pass through the gate circuit 53 to actuate the output counter 55. This arrangement provides a high precision measurement of the timing displacement of interest, because the oscillator 54 may be crystal controlled or otherwise stabilized to a high degree. Although other frequencies may be used, if desired, such an arrangement conveniently provides a count directly in the number of microseconds of timing displacement between the two signals.

It will be recognized that the various amplifiers, pulse shapers and other circuit elements which may be utilized in providing this count relationship have been omitted for purposes of simplifying the representation. Similarly, it will be recognized that there has not been shown any means for resetting the output counter 55 after a first reading has been taken. In accordance with conventional recording techniques, continuous readings may be taken, or the successive readings of the counter 55 may be recorded by digital recording instruments.

The feedback gain control device 50 may be adjusted by the gain control means 51 so as to reduce or increase the time averaging introduced into the correlation product signal. The greater the time-averaging interval, the smaller is the probable error in the correlation output signal and the greater is the correspondence to the correlation function, or to the correlation function derivative. The amount of feedback, and, therefore, the amount of time averaging introduced into the correlation product signal, may, therefore, be changed to permit the system to operate most efficiently for a given environment. Where high accuracy is desired, the time-averaging interval may be increased, whereas the time-averaging interval may be decreased in order to secure higher tracking speeds and faster response.

The speed change mechanism 48, which is coupled through the servo motor 45 to the movable playback transducer 25 and the movable reference transducer 29, may also be employed to change the time averaging introduced by the system. By "speed change mechanism" is meant a speed change gearing, mechanical linkage or variable mechanical coupling of some other kind. Because a closed loop exists from the playback transducers 24 and 25 through the signal multiplying network 35 and through the servo device and the speed change mechanism 48 back to the movable playback transducer 25, the relative speed of operation introduced by the speed change mechanism 48 can be considered as part of the gain of the closed loop system. The speed change mechanism 48 may be used to control the rate of response and time averaging independently, to select different ranges in which the feedback gain control device 50 may operate, or may be used in a compensatory fashion with the feedback control device 50 so as to maintain both the speed of movement of the movable playback transducer 25 and the amount of negative feedback signal, as well as the time-averaging interval, within convenient operative limits.

Greater accuracy may be obtained in measuring the relative timing displacement between the mutually coherent signal components of the two signals, A and B, through the use of the transposing switches 13. It will be recognized that in the use of a variable delay device such as the magnetic drum 20, certain differences may arise in phase shift, frequency response and attenuation between the signals passing through the different signal channels. Accordingly, the transposing switches 13 may be operated to divert each of the signals A and B into the opposite channel so that the extent of these differences may be determined. Although the signal which was previously leading is now lagging when the signal channels are transposed, the absolute value of the magnitude of the relative timing displacement remains the same, except, of course, for the differences noted. Therefore, the difference between the readings taken with and without transposition represent the inaccuracies arising within the system itself, and this difference may be compensated for by adjustment of the circuitry or corrected for by averaging the two readings in computing the relative timing displacement measurement.

A signal analyzing system as described above in conjunction with FIG. 1 may be utilized to particular advantage in position locating systems of the type employed for air traffic control purposes. One such system uses the relative timing differences in the reception of signals at two different locations from a common source to determine the position of a hyperbolic line on which the source is located. Using the two stations as focal points, the hyperbolic line of position is a line which defines those points having a given equal difference in path length to the two stations. Because the path length is directly equatable to the difference in time of reception of the signals from the common source at the two different stations, the relative timing displacement between mutually coherent signal components may be used for this purpose. A position locating system employing a signal analyzing system in accordance with the present invention may, as shown in FIG. 3, locate the position of distant signal sources through the use of only two spaced-apart stations.

The two stations, each of which includes receiving equipment and appropriate antenna equipment, are separated by a distance D. At a first one of the stations there may be located only a first receiver 70, while a second receiver and Doppler direction finding system 71 may be located at the second station. Upon commencement of a transmission from a distant signal source to which the receivers of the two stations are tuned, the detected and amplified signals provided from the receivers are applied to a signal analyzing system 73 as above described. The signal analyzing system 73 may be positioned at a location intermediate the two stations, or may be located at one of the stations, with appropriate compensation being made for the constant delays introduced in the transfer of the received signals from the receiving stations to the point of processing.

The signal analyzing system 73 determines the relative timing displacement between the mutually coherent signal components of the two signals received at the first and second receivers 70 and 71. This information is sufficient to identify the hyperbolic line of position on which the transmitting distant signal source is located. The position of the distant signal source along the hyperbolic line of position may be fixed through use of a Doppler direction finding system at the second station. Because the hyperbolae are drawn with the two stations as focal points, a line of direction taken from one of the stations will intersect a hyperbola, so that a non-ambiguous reading will be provided. The relative timing displacement information provided from the signal analyzing system 73 and the line of direction information provided from the Doppler direction finder at the second station may be applied to a computer 74 which makes the necessary computations to determine the point of intersection of the hyperbolic line of position and the line of direction, and to control a position indicator 75.

While arrangements in accordance with the invention have been described principally in conjunction with air traffic control systems, it will be recognized that the same signal analysis may be employed wherever it is desired to determine the relative timing displacement between signals having mutally coherent signal components. It will further be recognized that other variable delay devices, signal multipliers and output indication systems may be employed than those described. Further, while the system is particularly well suited to the operation with the derivative of the correlation function, the servo error signal may also be derived by other arrangements in order to use the $$\frac{\sin x}{x}$$

characteristic of the correlation function directly

I claim:
1. A system for measuring the relative timing displacement of mutually coherent signal components of two electrical series signals which appear in the presence of noise, the system including the combination of:
   a rotatable magnetic drum;
   first and second input signal terminal means, each of which is responsive to a different one of the electrical signals;
   a pair of recording devices each associated with a different recording channel on the magnetic drum;
   transposing switch means coupled between the signal input terminals and the recording devices and operating to couple the electrical signals to the recording devices;
   a pair of playback devices associated with the different recording channels on the magnetic drum, one of the playback devices being substantially fixed relative to the associated recording channel and the drum and the other being movable along the recording channel to provide a variable timing displacement between the signals reproduced in the channels;
   an integrator circuit coupled to the movable reproducing head to provide a substantially 90° phase shift between the signals reproduced from the magnetic drum;
   a signal multiplying network coupled to the fixed playback head and to the integrator circuit to provide correlation product signals which represent in instantaneous value a relatively short term average of the product of the instantaneous values of the reproduced signals;
   a positioning system including a servo motor for controlling the position of the movable reproducing head;
   servo amplifier means coupled to receive correlation product signals from the signal multiplying network and to provide correlation output signals to the servo motor;
   a tachometer device coupled to the servo motor and coupled to provide a negative feedback signal to the servo amplifier which opposes the correlation product signal, thus to provide a relatively long term averaging of the product signals from the signal multiplying network; and
   an output indication device coupled to the movable reproducing head and operating to provide a measure of the spacing along the channels between the fixed reproducing lead and the movable reproducing head, whereby there is provided a measure of relative timing displacement between the mutually coherent signal components of the electrical singals.

2. The invention as set forth in claim 1 above, wherein the system for controlling the position of the movable reproducing head includes in addition a D.C. to A.C. modulator coupled to the signal multiplying network, a servo mixer coupling the D.C. to A.C. modulator to the servo amplifier, a coupling from the tachometer to the servo mixer, and wherein the system in addition also includes a reference wave source coupled to the servo motor, the tachometer and the D.C. to A.C. modulator for providing excitation of the servo motor and the tachometer in synchronism with the modulator.

3. The invention as set forth in claim 2 above, wherein the system in addition includes means coupled between the tachometer and the servo mixer for controlling the gain of the negative feedback signal applied from the tachometer to the servo mixer, and wherein in addition a speed change mechanism is mechanically coupled between the servo motor and the movable reproducing head.

4. The invention as set forth in claim 1 above, wherein the output indication system includes:
   a reference mark on the magnetic drum;
   a movable reference head coupled to and movable with the movable playback head and a fixed reference head having an axial relationship along the drum with the fixed playback head, each of the movable reference and the fixed reference head being operatively associated with the recording channel in which the reference mark is positioned;
   a fixed frequency pulse generator providing reference pulses at a high frequency;
   gate circuit means coupled to the movable reference head and the fixed reference head and operable in response thereto to gate signals from the fixed frequency oscillator during intervals initiated by the passage of the reference mark past the movable reference head and terminating with the passage of the reference mark past the fixed reference head; and
   output counter means coupled to the gate circuit means for providing a digital representation of the relative timing displacement between the mutually coherent signal components of the applied electrical signals.

References Cited in the file of this patent

UNITED STATES PATENTS

| 2,907,400 | Swafford | Oct. 6, 1959 |
| 2,912,164 | Seevers | Nov. 10, 1959 |
| 2,918,581 | Willey et al. | Dec. 22, 1959 |

OTHER REFERENCES

An Analog Electronic Correlator for Acoustic Measurements (Goff), The Journal of the Acoustical Society of America, vol. 27, March 1955, pp. 223–236.

Ahrendt: Servomechanism Practice, McGraw Hill, 1954 (received Dec. 10, 1956) (TJ, 214, A4), pp. 115–116 relied on.